(12) United States Patent
Bull

(10) Patent No.: US 7,594,780 B2
(45) Date of Patent: Sep. 29, 2009

(54) DAMPING PLATES

(75) Inventor: Diana Bull, Philadelphia, PA (US)

(73) Assignee: Ocean Power Technologies, Inc., Pennington, NJ (US)

( * ) Notice: Subject to any disclaimer, the term of this patent is extended or adjusted under 35 U.S.C. 154(b) by 0 days.

(21) Appl. No.: 11/799,138

(22) Filed: May 1, 2007

(65) Prior Publication Data

US 2008/0131208 A1 Jun. 5, 2008

Related U.S. Application Data

(60) Provisional application No. 60/796,388, filed on May 1, 2006.

(51) Int. Cl.
*B63B 22/00* (2006.01)
(52) U.S. Cl. .................. 405/195.1; 441/22; 114/258
(58) Field of Classification Search ............. 405/195.1, 405/205; 114/258
See application file for complete search history.

(56) References Cited

U.S. PATENT DOCUMENTS

| | | | | |
|---|---|---|---|---|
| 2,352,862 A | * | 7/1944 | Rabuse | 434/25 |
| 3,167,793 A | * | 2/1965 | Keats | 441/22 |
| 3,191,388 A | * | 6/1965 | Ludwig | 405/197 |
| 3,425,383 A | * | 2/1969 | Scherer | 114/282 |
| 3,500,783 A | * | 3/1970 | Johnson, Jr. et al. | 114/264 |
| 3,755,836 A | * | 9/1973 | Milazzo | 441/22 |
| 3,934,533 A | * | 1/1976 | Wainwright | 114/39.31 |
| 4,470,544 A | * | 9/1984 | Bronicki et al. | 239/2.1 |
| 4,474,129 A | * | 10/1984 | Watkins et al. | 114/243 |
| 5,132,550 A | * | 7/1992 | McCabe | 290/53 |
| 5,722,797 A | * | 3/1998 | Horton, III | 405/224 |
| 5,842,838 A | * | 12/1998 | Berg | 417/331 |
| 6,102,625 A | * | 8/2000 | Olsen et al. | 405/195.1 |
| 6,718,130 B2 | * | 4/2004 | Grober | 396/55 |
| 7,033,115 B2 | * | 4/2006 | Huang et al. | 405/206 |
| 2004/0028479 A1 | * | 2/2004 | Horton, III | 405/223.1 |
| 2004/0061338 A1 | * | 4/2004 | Woodbridge | 290/53 |
| 2004/0141812 A1 | * | 7/2004 | Busso | 405/203 |
| 2004/0208707 A1 | * | 10/2004 | Huang et al. | 405/206 |
| 2006/0120809 A1 | * | 6/2006 | Ingram et al. | 405/195.1 |
| 2007/0059105 A1 | * | 3/2007 | Chang | 405/195.1 |

* cited by examiner

*Primary Examiner*—Tara Mayo-Pinnock
(74) *Attorney, Agent, or Firm*—Henry I. Schanzer, Esq.

(57) ABSTRACT

A damping (or heave) plate comprises a generally flat plate attached, beneath the surface of a sea, and in horizontal orientation, to a structural member subject to being vertically moved in response to passing surface waves. The plate tends to resist vertical movements and has the effect of adding mass to the structure. A vertically extending structure is added to both major surfaces of the heave plate for increasing the volume of water moved by the plate. For minimizing drag forces generally created by use of the damping plate, the vertically extending structure is shaped to include curved hydrodynamic surfaces for minimizing turbulence in the surrounding water.

14 Claims, 1 Drawing Sheet

DAMPING PLATES

This invention claims priority from provisional application Ser. No. 60/796,388 filed May 1, 2006 for Wave Energy Converter (WEC) with Heave Plates whose contents are incorporated herein by reference.

BACKGROUND OF THE INVENTION

This invention relates to improvements in damping plates (also known as heave plates) and, while not so limited, relates particularly to damping plates used in apparatus for converting energy contained in waves on the surface of bodies of water to useful energy.

The use of damping plates, e.g. a horizontally oriented flat plate attached to a submerged vertical spar of a floating oil platform, is generally known. The plates have the effect of increasing the mass and the viscous drag of the members to which they are attached, thus making the members less likely to be driven into destructive movements by excessively high surface waves and winds.

Such damping plates are also useful in certain types of apparatus, known as wave energy converters (WECs), for converting energy in surface waves on bodies of water to useful energy. One type of such WEC comprises a pair of floats which bob up and down in response to passing surface waves. Relative movements between the floats are used for driving an energy converter, for example, an electrical generator connected between the floats for generating electrical or any useful energy.

The amount of energy produced by a given WEC is a function of, among other things, the mass of the floats driven into motion by the passing waves. For increasing the effective mass of at least one of the floats, a practice is to suspend a submerged damping or heave plate from the float. The effective mass of the float from which the damping plate is suspended is increased due to the fact that the acceleration and deceleration of the plate through the water requires movements of some volume of water around the plate. The greater the amount of water moved by the plate, the greater is the increase of the float mass.

The amount of water moved by a given damping plate is a function of the size of the plate. Also, as disclosed in co-pending patent applications, titled "Heave Plate with Improved Characteristics" bearing Ser. No. 11/796,851, and "Wave Energy Converter (WEC) with Heave Plates bearing Ser. No. 11/796,852, assigned to the assignee of the present application, and the subject matter of which is incorporated herein by reference as though fully set forth herein, the addition of a vertically extending structure, e.g. a lip along the edges of the heave plate, significantly increases the amount of water moved by the plate, hence the amount of mass added to the float.

While useful for adding effective mass to a float, a problem associated with the use of damping plates, at least in connection with WECs, is that the viscous drag forces associated with the plates tends to impede relative movements, thus tending to negatively affect power generation. The present invention provides means for minimizing the drag forces typically associated with the use of damping plates of the type described.

SUMMARY OF THE INVENTION

A damping (heave) plate, of generally flat configuration, includes a projecting structure, typically in the form of a ledge or lip along the plate edges, for increasing the volume of water moved by the plate. In accordance with the present invention, the projecting structure has a streamlined configuration, including curved hydrodynamic surfaces, for minimizing turbulence in the surrounding water and attendant drag forces.

BRIEF DESCRIPTION OF THE DRAWINGS

The drawings are schematic and not to scale.

DETAILED DESCRIPTION OF THE INVENTION

Figure 1:
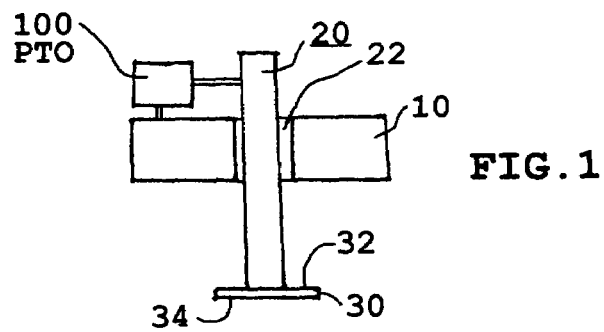
FIG. 1 is a side view of a wave energy converter of known type including an elongated "spar" float having a damping plate attached to the lower end thereof.

As shown schematically in FIG. 1, a preferred WEC comprises a first, annular float 10 of a generally flat configuration, and a second, elongated float 20, referred to as a "spar" float, extending through an opening 22 through the annular float 10. In accordance with known technology, the two floats are configured to bob up and down in generally out of phase relationship in response to passing surface waves. A power take off device (PTO) 100 is connected between the float and spar to convert their relative motion into useful energy (e.g. electrical).

A damping plate 30 is disposed at the lower end of the spar float 20 for increasing its effective mass. As illustrated, the damping plate comprises an essentially flat plate having major surfaces 32 and 34 extending transversely to the directions of motion of the plate 30 through the water.

The effect of the damping plate 30 is to add mass significantly greater than that of the plate itself to the spar float 20. Such added mass is due to the fact that the acceleration or deceleration of the plate requires movement of some volume of fluid around the plate as it moves. It has been established that the volume of fluid that the plate will move, by itself and without the added structure herein disclosed, is proportional to the equivalent volume of the plate times some experimentally determined factor [see, Chakrabarti, S. K. (1987), "Hydrodynamics of Offshore Structures", WIT Press and Computational Mechanics Publications.] The volume of fluid moved is also a function of the frequency with which the plate is moving. This parameter is not discussed herein.

The equivalent volume of the plate depends upon the geometry of the plate, and the general rule is that the equivalent volume is equal to the area of the plate multiplied by a height dimension equal to a lateral dimension of the plate; for example, the width of a rectangular plate, the side of a square plate, or the diameter of a circular plate.

The accelerated flow inertia force caused by the damping plate is the added mass of the system (the density of water times the equivalent volume times the experimentally determined factor) times the acceleration of the system, or:

$$F_{Inertial} = (C_m V_{equivalent} \rho) a = \text{AddedMass} * a, \quad \text{Equation 1}$$

where $C_m$ is the experimentally determined factor $V_{equivalent}$ is the equivalent volume defined above, $\rho$ is the density of water, and $a$ is the acceleration. Note that the added mass term, with units of mass, is the combination of the variables inside of the parenthesis.

For purposes of analysis, the viscous drag can be separated into two components known as skin friction drag and form drag. Skin friction drag arises from the friction of a fluid against the surface ("skin") of the object that is moving through the fluid. Form (or profile or pressure) drag is mainly due to boundary layer separation of the fluid due to the form, i.e. shape, of the object. Form drag varies (non-linearly) as the square of velocity; thus the viscous drag of the system is non-zero only when there is a non-zero velocity.

A boundary layer of fluid is created around an object due to the friction of the fluid against the surface of the object. Flow separation, or boundary layer separation, occurs when this boundary layer of fluid detaches from the surface of the object. When separation occurs the fluid forms eddies and vortices (spinning and often turbulent flow). Flow separation can (and in the case of damping plates does) result in increased drag as the object moves through the fluid. An experimentally determined drag coefficient relates the strength of the viscous drag force to relative flow velocity. When there is no flow separation the drag coefficient will be lower than when vortices are formed. The thinness of the plate and porosity of the plate are important factors for the drag coefficient since they create a series of sharp angles from which the flowing water can separate [see, Chua, K. H., Clelland, D., Huang, S., and Sworn, (2005) "Model Experiments of Hydrodynamic Forces on Heave Plates", Proceedings of 24th International Conference on Offshore Mechanics and Artic Engineering, Halkidiki, Greece]. Thus, when the spar damping plate unit is moving in heave, the flow of water past these sharp edges has a tendency to create vortices, creating a turbulent boundary layer, hence increasing the damping of the system. In contrast to sharp edges, the flow around blunt shaped structures without sharp corners, such as cylinders or spheres, can exhibit no flow separation, separation with no vortex shedding, and separation with vortex shedding coinciding with an increase in heave amplitude (often evaluated normalized by the diameter of the object in heave; see, Faltinsen, O. M. 1990; "Sea Loads on Ships and Offshore Structures"; Cambridge University Press, Cambridge). Thus if a blunt shaped object is moved only a fraction of its diameter no flow separation occurs.

Returning to the matter of adding mass to the system, a vertical structure, such as shown in FIGS. 2-9, is added to the damping plates for increasing the volume of fluid moved by the plates. Each figure shows the lower end of a spar float 20 to which a known type of damping plate 30 is attached. The figures are only a schematic and it is possible to have a "spar" that is comprised of multiple components, a truss spar. Because the spar float oscillates in the vertical direction, the added structure encompasses both the upper and lower surfaces of the damping plates.

As previously described, the damping plate 30, by itself, moves a volume of fluid proportional to the "equivalent volume" of the plate, determined primarily by the area of the plate. With the added vertical structure, an additional amount of fluid is moved as a function of the volume enclosed by the plate and the added surrounding structure, i.e. the height of the added structure multiplied by the area of the plate. Also, in some instances, the added structure functions to increase the effective area of the plate thereby further increasing the amount of fluid moved by the plate.

Figures 2, 3, 4:
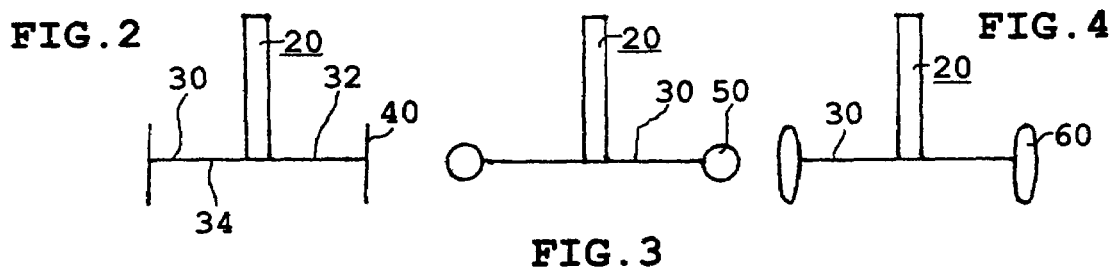
FIG. 2 shows the lower end of the spar float shown in FIG. 1 but with a known modification of the damping plate.
FIGS. 3 through 9 are similar to FIG. 2 but show damping plates according to the instant invention.

In FIG. 2, the added structure comprises a number of thin plates 40 secured to and extending completely around the edge of the damping plate 30 and perpendicular thereto. The plates can be edge-joined to one another, thus comprising a cylinder enclosing the plate 30. The additional added mass achieved by the vertical plates is, for movements in either the up or down direction, proportional to the vertical height of the plates 40 above or below the plate 30, respectively, multiplied by the area of the plate 30. The structure shown in FIG. 2 is disclosed in the previously cited provisional application Ser. No. 60/796,388. A problem associated with the FIG. 2 damping plate 30, however, is that the plates 40 terminate in sharp edges which tend to generate undesirably high drag forces. Conversely, in the structures shown in FIGS. 3-9, sharp edges are avoided and lower drag forces are present.

In FIG. 3 the added structure comprises a tube 50 of circular cross-section and outer diameter D disposed along the edge of the plate 30. This results, similarly as in FIG. 2, in an added mass proportional to the height of the tube 50 above and below the plate 30 multiplied by the area of the plate 30, but with the added effect that the area of the plate is increased by the area of the circular tube 50. An advantage of this embodiment is that the smooth circular shape of the vertical portion of the tube wall keeps the fluid flow attached to the structure thus decreasing the drag coefficient.

In FIG. 4, the added structure comprises an elliptic cylinder 60 (a 3-dimensional object with an oblong cross-section) surrounding the plate 30. This results in a larger addition to the mass added to the plate 30 then that provided by the structure shown in FIG. 2 provided the longer side is oriented perpendicular to the plate 30. The smooth shape of the elliptic cylinder tends to keep the fluid flow attached to the structure thus decreasing the drag coefficient.

Figures 5, 6, 7:
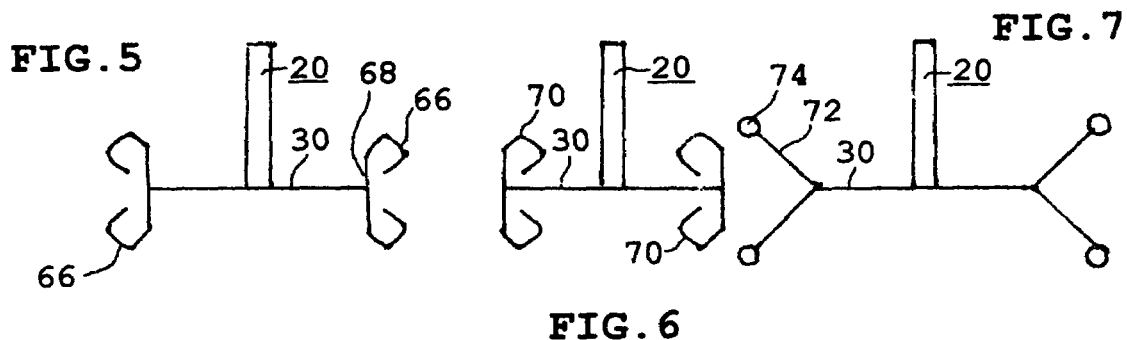

In FIG. 5, the addition comprises semi-circular beads or rims 66 facing away from the plate 30 at the top and bottom ends of a vertical cylinder 68 (as in FIG. 2). The rims 66 add to the area of the damping plate thus increasing the equivalent volume thereof, hence the amount of fluid moved thereby. The additional added mass achieved by the vertical cylinder 68 is proportional to the height of the cylinder multiplied by the area of the damping plate. The curved shape of the rims keeps the fluid flow attached to the structure thus decreasing the drag coefficient.

In FIG. 6, the additional structure is similar to that shown in FIG. 5 except that the rims 70 face inwardly of the plate edge. An advantage of this is that the fluid inside the rims is isolated from the fluid around the plate structure thus decreasing the strength of the vortex shedding and hence the drag coefficient.

In FIG. 7, the added member comprises a cylinder 72 having a wall of V-shaped cross section thus including both vertical and horizontal components. As in the foregoing examples, the horizontal components result in added mass by adding to the equivalent volume of the plate 30, while the added mass achieved by the vertical components is the height of such components multiplied by the area of the plate. FIG. 7 also shows the placement of smooth (blunt-shaped) objects, here, full circular tubes 74 at the ends of the cylinder 72 for keeping the fluid flow attached to the structure for decreasing the drag coefficient. Other objects, such as the semi-circular rims 66 and 70 shown respectively in FIGS. 5 and 6 can be used.

Figures 8, 9:
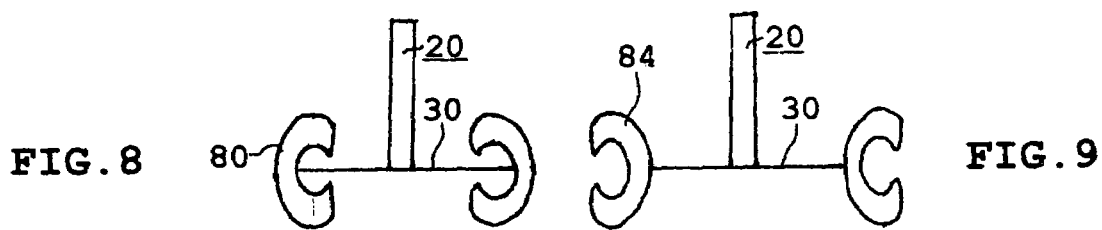

In FIGS. 8 and 9, the addition of thick circular members 80 or 84 to the plate 30 with vertical dimensions curving towards or away from the spar 20, respectively, increase the added mass as a function, as in previous examples, of the product of the vertical dimension and the plate area. The members 80 and 84 are shown as being relatively thick and hollow. Alternatively, the circular members can comprise curved plates. The smooth shapes of the circular members 80 and 84 help to keep fluid flow attached to the structure.

In general, the elimination of sharp corners on the edges of the plates or on vertically extending members added to the damping plates will decrease the drag coefficient. This is advantageous for WECs since decreasing the drag coefficient will result in larger relative motions and hence allowing for a more efficient capture of energy.

Another use of the invention is in industrial mixing processes (where an actuator causes a plate to oscillate in a container of non-mixed liquids) in which it is desired to suppress (or enhance) formation of small scale vortices. This can be accomplished by the use of vertically extending lip structures as above-described with more or less streamlining of the lip structures to obtain the desired results.

What is claimed is:

1. A damping plate comprising a first plate for being attached to the submerged end of a spar-like float in a body of liquid and said spar like float being subject to movement in the vertical directions, said first plate of generally solid flat configuration having a pair of oppositely facing major surfaces extending transversely of the up down movement of the spar-like float, and vertically extending structures mounted on said major surfaces of said first plate for increasing the volume of liquid pushed aside during movements of the plate through the liquid said vertically extending structures defining an enclosure whose sides are solid and of predetermined height for capturing a volume of water which is a function of the enclosed surface area of the damping plate multiplied by the height of the vertically extending structures for increasing the effective mass of water pushed during the up down movement of the damping plate through the water; said vertically extending structures having streamlined curved configurations for minimizing turbulence and the amount of drag created by the up down movement of the damping plate in the body of liquid.

2. A damping plate in accordance with claim 1 wherein said vertically extending structures have smooth and curved surfaces.

3. A damping plate in accordance with claim 1 wherein said vertically extending structures have an elliptical cross-section.

4. A damping plate in accordance with claim 1 wherein said vertically extending structures comprise second plates disposed at edges of said first plate and terminating above and below said first plate in rims having curved walls.

5. A damping plate in accordance with claim 1 wherein said vertically extending structures comprise one or more semi-circular members disposed at one or more edges of said first plate.

6. A damping plate as claimed in claim 1, wherein the liquid is water and the movement is oscillatory responsive to passing waves.

7. A damping plate in accordance with claim 1 wherein said vertically extending structures have a circular cross section extending along the periphery of the first plate.

8. Apparatus including a damping plate comprising a first plate for being attached to the submerged end of a spar-like float in a body of liquid and subject to movement in the vertical directions, said plate having a pair of oppositely facing surfaces extending transversely of the vertical up and down movement of the spar-like float, and vertically extending structures mounted on said surfaces for increasing the volume of liquid pushed aside during the up down movements of the plate through the liquid said vertically extending structures defining an enclosure whose sides are solid and of predetermined height for capturing a volume of water which is a function of the enclosed surface area of the damping plate multiplied by the height of the vertically extending structures for increasing the effective mass of water pushed up and down during movement of the damping plate through the water; said vertically extending structures having streamlined curved configurations for minimizing the amount of drag created by the up and down movement of the damping plate.

9. Apparatus as claimed in claim 8, further including a float intended to lie along the surface of a body of water and designed to move generally in-phase with the waves present in the body of water; and wherein said spar-like float is intended to extend vertically, generally perpendicular to the float and the surface of the body of water, said spar-like float extending below the surface of the body of water and being intended to move vertically up and down generally out-of-phase with the waves; and further including a power take off device (PTO), connected between the spar-like float and the float, responsive to their relative motion to convert the relative motion to useful energy.

10. Apparatus as claimed in claim 9, wherein said vertical structures have a circular cross section and extend continuously along the periphery of the damping plate.

11. Apparatus as claimed in claim 10, wherein said vertical structures are symmetrically disposed above and below the damping plate.

12. A wave energy converter (WEC) comprising: a float for floating on a surface of a body of water for generally in-phase movements with the waves present in the body of water; an elongated spar for floating vertically in the body of water for generally out-of-phase movements with the waves; a power take off device (PTO), connected between the spar and the float for converting relative motion there between to useful energy; a heave plate connected to a submerged portion of the spar, said heave plate extending in a plane perpendicular to the spar and having a pair of oppositely facing surfaces extending transversely to the vertical directions of movement of the spar, and vertical structures mounted on the oppositely facing surfaces, said vertical structures defining an enclosure whose sides are solid and of predetermined height for capturing a volume of water which is a function of the enclosed surface area of the damping plate multiplied by the height of the vertically extending structures for increasing the effective mass of water pushed during the up and down movement of the damping plate through the water, said vertical structures having curved surfaces along its edges for lowering the viscous drag of said heave plate.

13. A WEC as claimed in claim 12, wherein said vertical structures have one of a generally elliptical and circular cross section extending along the periphery of the heave plate.

14. A WEC as claimed in claim 12, wherein said vertical structures extend symmetrically above and below the heave plate.

* * * * *